US007131936B2

(12) United States Patent

Schlosser

(10) Patent No.: US 7,131,936 B2
(45) Date of Patent: Nov. 7, 2006

(54) APPARATUS FOR TRAINING A BODY PART OF A PERSON AND METHOD FOR USING SAME

(76) Inventor: Frank J. Schlosser, 4520 Coachman, Santa Maria, CA (US) 93455

( * ) Notice: Subject to any disclaimer, the term of this patent is extended or adjusted under 35 U.S.C. 154(b) by 11 days.

(21) Appl. No.: 11/052,446

(22) Filed: Feb. 7, 2005

(65) Prior Publication Data

US 2005/0209065 A1 Sep. 22, 2005

Related U.S. Application Data

(60) Provisional application No. 60/579,656, filed on Jun. 16, 2004, provisional application No. 60/553,528, filed on Mar. 17, 2004.

(51) Int. Cl.

| | |
|---|---|
| ***A63B 71/00*** | (2006.01) |
| ***A63B 22/00*** | (2006.01) |
| ***A61H 3/00*** | (2006.01) |
| ***A47D 13/04*** | (2006.01) |
| ***G09B 19/00*** | (2006.01) |

(52) U.S. Cl. ............................ 482/69; 482/8; 434/255

(58) Field of Classification Search .................. 482/69, 482/900, 901, 909, 54; 434/255
See application file for complete search history.

(56) References Cited

U.S. PATENT DOCUMENTS

| | | | | |
|---|---|---|---|---|
| 2,812,010 | A * | 11/1957 | Abdallah | 482/69 |
| 2,871,915 | A * | 2/1959 | Hogan | 482/69 |
| 3,780,663 | A * | 12/1973 | Pettit | 104/307 |
| 4,779,881 | A | 10/1988 | Baker | 280/242 |
| 4,948,118 | A * | 8/1990 | Miraglia | 482/55 |
| D315,884 | S | 4/1991 | Baker | D12/128 |
| 5,389,054 | A * | 2/1995 | Dorman | 482/34 |
| 5,439,226 | A * | 8/1995 | Luedtke | 473/232 |
| 5,634,858 | A * | 6/1997 | Bellagamba | 473/257 |
| 5,695,432 | A * | 12/1997 | Soderlund | 482/69 |
| 5,732,954 | A * | 3/1998 | Strickler et al. | 273/441 |
| 5,800,318 | A | 9/1998 | Coviello | 482/68 |
| 5,897,457 | A * | 4/1999 | Mackovjak | 482/8 |
| 5,997,444 | A * | 12/1999 | McBride | 482/69 |
| 6,114,645 | A * | 9/2000 | Burgess | 200/512 |
| 6,273,844 | B1 * | 8/2001 | Kelsey et al. | 482/54 |
| 6,416,448 | B1 | 7/2002 | Hassler | 482/131 |

(Continued)

OTHER PUBLICATIONS

*About the Conductive Learning Center,* Five (5) Pages, Internet download from http://www.Aquinas.edu/clc/, Sep. 15, 2004.

(Continued)

*Primary Examiner*—Stephen R. Crow
*Assistant Examiner*—Arun Singh Chhabra
(74) *Attorney, Agent, or Firm*—Daniel J. Meaney, Jr.

(57) ABSTRACT

Apparatus for training a body part, such as for example the feet or head, of a person is shown. The apparatus structure is configured to receive and support the body part. The structure includes a body part-supporting member defining a movement path of a selected distance to be traversed by the body part during training. At least one sensor is positioned along the movement path representing a selected distance to be traversed by the body part during trained. The sensor is physically contacted by and is actuated by the body part. A signal control circuit is responsive to actuation of the sensor for generating a feedback signal which is communicated to such person to verify that such person's body part has traversed the selected distance. A method for training a body part of a person including a head, leg or arm is also shown.

8 Claims, 7 Drawing Sheets

U.S. PATENT DOCUMENTS

| | | | | |
|---|---|---|---|---|
| 6,616,544 | B1 * | 9/2003 | Kimmorley | 473/218 |
| 6,676,569 | B1 * | 1/2004 | Radow | 482/4 |
| 6,689,075 | B1 * | 2/2004 | West | 601/23 |
| 6,749,432 | B1 * | 6/2004 | French et al. | 434/247 |
| 6,821,233 | B1 * | 11/2004 | Colombo et al. | 482/54 |
| 6,878,100 | B1 * | 4/2005 | Frykman et al. | 482/54 |
| 6,916,273 | B1 * | 7/2005 | Couvillion et al. | 482/8 |

OTHER PUBLICATIONS

*Anatomy of the upper limb: a partnership in learning assessment*, One (1) Page, Internet download Entrez Pubmed, http://ncbi.nlm.nih.gov, Sep. 15, 2004.

* cited by examiner

6

APPARATUS FOR TRAINING A BODY PART OF A PERSON AND METHOD FOR USING SAME

CROSS-REFERENCES TO RELATED APPLICATIONS

This Application claims the benefit, under Title 35, United States Code §119(e), of U.S. Provisional Patent Application Ser. No. 60/553,528 filed Mar. 17, 2004 and of U.S. Provisional Patent Application Ser. No.: 60/579,656 filed Jun. 16, 2004.

STATEMENT REGARDING FEDERALLY SPONSORED RESEARCH OR DEVELOPMENT

Not Applicable

REFERENCE TO A "MICROFICHE APPENDIX" (SEE 37 CFR 1.96)

Not Applicable

BACKGROUND OF THE INVENTION

1. Field of the Invention

The present invention relates to an apparatus for training a body part of a person and more particularly to apparatus having a structure configured to receive and support a body part of a person requiring training, at least one sensor positioned along a movement path having a selected distance to be traversed by a body part of such person while being trained and a signal control circuit operatively connected to the at least one sensor. The signal control circuit is responsive to the body part actuating the at least one sensor for generating a feedback signal which is communicated to such person to verify that such person's body part has traversed a selected distance.

2. Description of the Prior Art

It is known in the art to provide apparatus for therapy and training for constrained knee-joint movement. One example of such therapy and training equipment is disclosed in U.S. Pat. No. 6,416,448.

U.S. Pat. No. 5,800,318 discloses rehabilitation thru training principal/walker type device for exercising a user's lower body while giving the user independence of an assisted walking device. The trainer/walker device includes a frame including a seat and vertical legs that are adjustable to control the height of the frame.

U.S. Pat. No. 4,779,881 discloses a mobile vertical supporting apparatus for a child comprising support frame having main wheels and castor wheels wherein the support frame supports a body support section and a belting system for positioning a user in a substantially vertical position and for concurrently applying an uplifting force to the body of a user permitting the legs to be unrestrained and freely able to move.

U.S. Pat. No. DES 315,884 discloses a vertical supporter for a child or the like having a belting means for supporting the body of a user against a body support.

U.S. Pat. No. 6,616,544 discloses an indication device in the form of a mechanism adapted to be placed in a golf shoe for interacting with one or both feet of a golfer during a golf swing to provide a tactile indication to a golfer that either of both feet are maintaining recommended positions.

It is also known in the art to use a method known as "Conductive Education" that is an intensive, multi-disciplinary approach to education, training and development for individuals with cerebral palsy, spina bifida and other motor challenges. The Conductive Education method was developed in Hungary in 1945 by Dr. Andras Peto. Conductive Education is based on the theory that the central nervous system has the capacity to form new neural connections, despite neurological damages. The Conductive Education method is based on repeating tasks and on verbal support from healthcare providers observing the child perform the tasks, e.g., attempting to walk. The combination of repeating the tasks and verbal support is designed to help a child gain movement and skills, all of which require a significantly long period of time, in the order of months or longer, to achieve the targeted training results.

None of the known prior art anticipates, discloses, suggests or teaches apparatus for training a body part of a person and method of using same disclosed and taught herein.

BRIEF SUMMARY OF THE INVENTION

The present invention provides a new, novel and unique apparatus for training a body part of a person and method of using same. The apparatus for training a body part of a person comprises a structure configured to receive and support a body part of a person requiring training. The structure has a body part supporting member defining a movement path of a selected distance to be traversed by a body part of a person while being trained. The apparatus includes at least one sensor which is positioned along the movement path and spaced a selected distance from a reference point representing a selected distance to be traversed by a body part of such person while being trained. The at least one sensor is responsive to the body part traversing the selected distance and physically contacting and actuating the at least one sensor. A signal control circuit is operatively connected to the at least one sensor and is responsive to the body part actuating the at least one sensor for generating a feedback signal which is communicated to such person to verify that such person's body part has traversed a selected distance.

In the preferred embodiment, the apparatus is used for training a person having a traumatic injury to walk. The apparatus comprises an elongated supporting structure having a walking platform defining a walking path to be traversed in strides of a selected distance by the feet of a person while being trained to walk. The apparatus includes at least two electrodes positioned on the walking platform and spaced to have a selected distance therebetween representing a stride to be traversed by the feet of such person while being trained to walk. A moveable body support member is configured to be transported along a plane substantially parallel to the walking path and spaced a predetermined distance from the walking platform. A body harness receives and supports the body of a person while being trained to walk. A body weight control apparatus is operatively connected between the body support member and the body harness to program a predetermined portion of body weight of such person to be supported by the feet while being trained to walk. A first conductive member and second conductive member are configured to be affixed to a walking surface of a pair of shoes to be worn by a person while being trained to walk. A signal control circuit is electrically connected to each of the first conductive member and the second conductive member and the at least two electrodes and is responsive to the first conductive member and the second conductive member making electrical contact with two adjacent electrodes located on the walking platform for generating a feedback signal which is communicated to such person when such person's feet concurrently position the first conductive member and the conductive member on and in electrical contact with two adjacent electrodes defining a stride.

In the preferred embodiment, the moveable body support member is separate from the housing structure. In the alternative, the moveable body support member may be integral with the housing structure.

In the preferred embodiment for use in training a user to walk, the body weight control apparatus programs a predetermined portion of body weight of such person to be supported by the feet of such person while being trained to walk. Typically, at the commencement of the training program, the apparatus and harness is arranged and adjusted or programmed to place about 10% of the user's body weight on the feet during training. As the user improves in walking, the apparatus and harness is arrangement is adjusted or programmed to place a greater percentage body weight onto the feet of a user until 100% of the total body weight of such person is support by the user while walking.

None of the known prior art devices anticipate, disclose, suggest or teach an apparatus and method of using the same wherein apparatus for training a body part of a person includes a signal control circuit for generating a feedback signal which is communicated directly to such person verifying that the users intentional and controlled movements of the body part undergoing the training using the apparatus has resulted in achieving the targeted training objectives and goals. The achieved goals can be directed to an uncomplicated training program involving training movement of a user's head over a movement path of a selected distance to a more complicated training program of teaching a user to walk in the form of achieving substantially uniform strides in walking under controlled body weight to ultimately achieve the goal of independent walking without the use of walking assistance apparatus.

Therefore, it is an advantage of the present invention to provide an apparatus for training a body part of a person.

Another advantage of the present invention is that the apparatus may include a structure configured to receive and support a body part of a person requiring training.

Another advantage of the present invention is that the apparatus may include a structure having a body part supporting member defining a movement path of a selected distance to be traversed by a body part of a person while being trained.

Another advantage of the present invention is that the apparatus may include at least one sensor positioned along the movement path and spaced a selected distance from a reference point representing a movement distance to be traversed by a body part of such person while being trained. The sensor is responsive to the body part traversing the selected distance and physically contacting and actuating the at least one sensor.

Another advantage of the present invention is that the apparatus may include a signal control circuit operatively connected to the at least one sensor and which is responsive to the body part actuating the at least one sensor for generating a feedback signal which is communicated to such person to verify that such person's body part has traversed a selected distance.

Another advantage of the present invention is that the body part that can be trained using the apparatus of the present invention may comprise the feet of a person and the training may comprise teaching a person to walk.

Another advantage of the present invention is that the body part that can be trained using the apparatus of the present invention may comprise the head of a person and the training may comprise teaching a person to move the head laterally from side to side.

Another advantage of the present invention is that the body part that can be trained using the apparatus of the present invention may comprise the legs or arms of a person and the training may comprise teaching a person to move the leg or arm in a lateral movement.

Another advantage of the present invention is that the apparatus may include a signal control circuit including an indication device to generate a feedback signal.

Another advantage of the present invention is that the apparatus may include a signal control circuit including an indication device to generate a feedback signal in the form of an audible sound.

Another advantage of the present invention is that the apparatus may include a signal control circuit including an indication device to generate a feedback signal in the form of a multi-level audible sound, such as chimes having two distinct tones, which can be used to verify and distinguish that a body part, e.g. a head, has successively physically engaged and actuated a left sensor as opposed to a right sensor.

Another advantage of the present invention is that the apparatus used for training a user to walk may include a first conductive member and a second conductive member formed of wire mesh affixed to the walking surface of the shoes. The conductors preferably are removeably electrically connected between the shoes.

Another advantage of the present invention is that the apparatus used for training user to walk may include at least two electrodes positioned on a walking platform and spaced to have a selected distance therebetween representing a stride to be traversed by the feet of such person while being trained to walk. The electrodes may comprise elongated shaped electrodes having a length that extends substantially perpendicular to the walking path. The spacing between the elongated shaped electrodes is of a selected distance representing a stride to be traversed by the feet of such person while being trained to walk.

Another advantage of the present invention is that the apparatus used for training user to walk may include an elongated handrail to enable such person while being trained to walk to grasp the elongated handrail for support while walking along the walking path defined by the walking platform.

Another advantage of the present invention is that a method is disclosed and taught herein for training a body part of a person using the apparatus disclosed herein.

Another advantage of the present invention is that a method is disclosed and taught herein for training a person having a traumatic injury to walk using the apparatus disclosed herein.

BRIEF DESCRIPTION OF THE DRAWING

The present invention will become more fully understood from the following detailed description of a preferred but non-limiting embodiment thereof, described in connection with the accompanying drawings, wherein:

FIG. 8 is a front, top and left side perspective view of another embodiment of a housing structure including an elongated supporting structure having a walking platform defining a walking and having integral therewith a moveable body support member configured to be transported along a plane substantially parallel to the walking path and spaced a predetermined distance from the walking platform and showing a body harness for receiving and supporting the body of a person while being trained to walk;

DETAILED DESCRIPTION OF THE INVENTION

Background

A specialized need has developed in the field of rehabilitation relating to the training of persons having a traumatic injury. The Conductive Education method discussed above requires the healthcare provider to be the sole source of verbal communication used in the rehabilitation and training process.

One example of such a developing need is in the training of persons having a traumatic injury to walk. The Conductive Education method requires months of repetitive training using conventional walking platform having handrails. The patient has the full body weight on the feet of the patient during the training sessions.

The teachings of the present invention provide a person, preferably a person having a traumatic injury, with the ability to train a body part using apparatus having a specifically designed structure that is configured to receive and support a body part of a person requiring training. The structure having the body part supporting member defines a movement path of a selected distance to be traversed by a body part of a person while being trained.

The apparatus includes at least one sensor positioned along the movement path and the sensor, when physically contacting and actuating by the user, enables a signal control circuit to generate a feedback signal which is communicated directly to such person to verify that such person's body part has traversed a selected distance.

There are three embodiments of such apparatus disclosed and taught herein, one for training the head and neck of a user and two others to train a person having a traumatic injury to walk wherein the training process included controlling or adjusting a predetermined portion of the body weight of a person using a body weight control apparatus programs to be supported by the feet of such person while being trained to walk. The preferred range of body weight is in the range from about 10% to about 100% of total body weight of such person.

It is envisioned that a variation of the embodiment for training the head could likewise be used and/or modified and/or adapted for training the legs or arms for movement, e.g. lateral movement training.

In describing the invention below with respect to the various figures, common elements illustrated in each of the figures are identified with the same numerals.

Apparatus for Training a Person Having a Traumatic Injury to Walk

Figure 1:
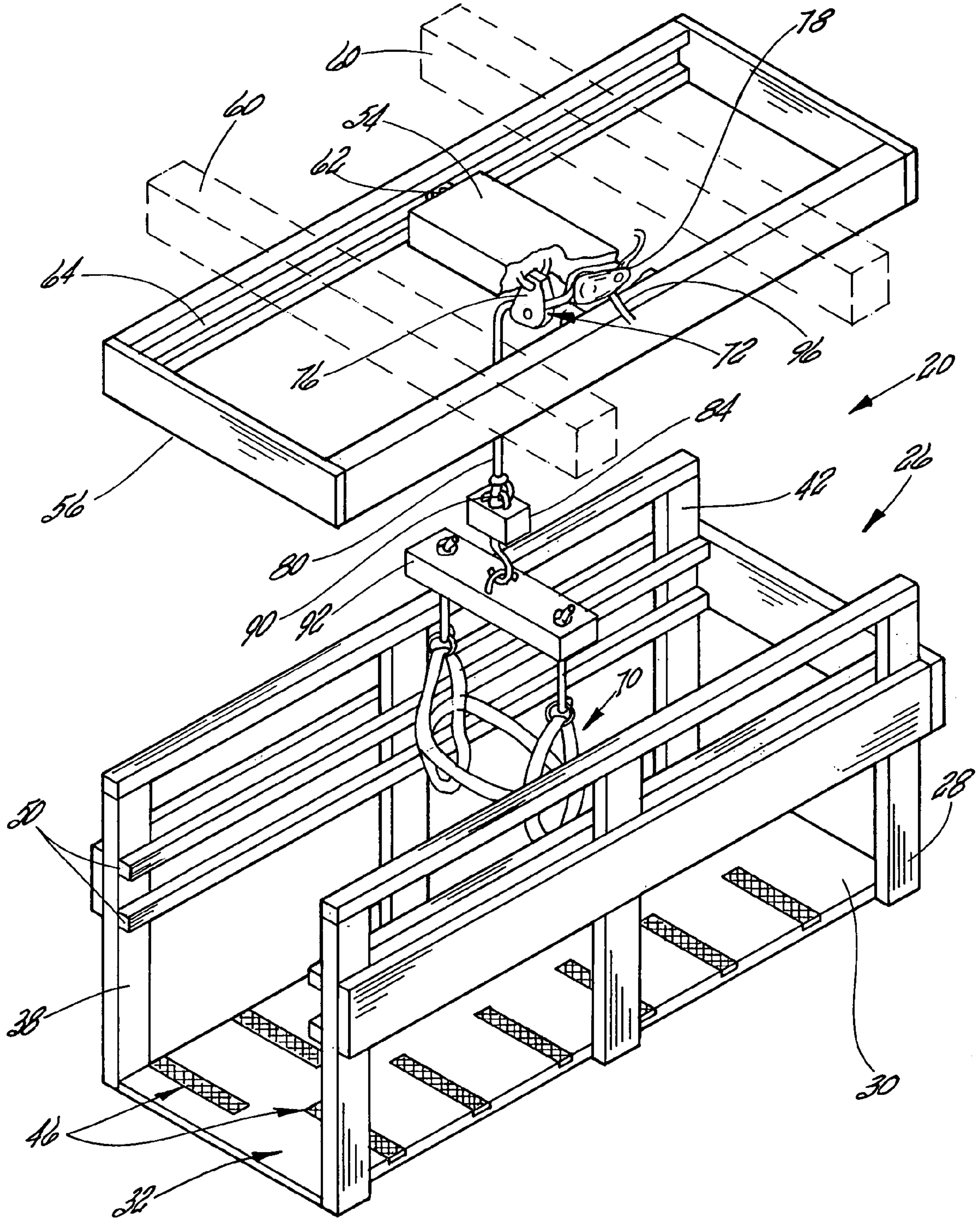
FIG. 1 is a front, top and left side perspective view of a housing structure including an elongated supporting structure having a walking platform defining a walking and a separate a moveable body support member configured to be transported along a plane substantially parallel to the walking path and spaced a predetermined distance from the walking platform and showing a body harness having a pulley and locking or ratcheting pulley arrangement for receiving and supporting the body of a person while being trained to walk.

FIG. 1 illustrates that apparatus shown generally by arrow 20 for training a person having a traumatic injury. The apparatus includes a housing structure shown by arrow 26 in the form of an elongated supporting structure 28 having a walking platform 30 which defines a walking path shown by arrow 32. The walking platform 32 defines a walking path to be traversed in strides of a selected distance by the feet of a person while being trained to walk.

The walking platform 30 is generally planar and is elongated extending from the left side 38 of the elongated supporting structure 28 to the right end 42. A plurality of electrodes shown by arrow 46 are located on the surface of the walking platform 32. Two sequential electrodes are spaced to have a selected distance therebetween representing a stride to be traversed by the feet of such person while being trained to walk. The electrodes 46 in this embodiment comprise elongated shaped electrodes having a length that extends substantially perpendicular to the walking path 30.

During training, each two adjacent electrodes 46 are positioned on the walking platform 30 and the spacing therebetween representing a stride to be traversed by the feet of such person while being trained to walk. The electrodes are configured to be physically contacted by the feet of a user which having mating and cooperating electrodes, as described hereinbelow in greater detail in connection with FIGS. 4 through 6.

The elongated supporting structure 28 further includes an elongated handrail shown by 50 to enable a person, while being trained to walk, to grasp the elongated handrail 50 for support while walking along the walking path defined by the walking platform 30.

In the embodiment of the apparatus 20 illustrated in FIG. 1, the apparatus 20 further includes a moveable body support member 54 supported by a separate elevated support structure 56. The elevated support structure 56 is attached to overhead support beams shown by dashed beams 60. The moveable body support member 54 moves within the elevated support structure 56 by means of a roller 62 within a track structure 64. The moveable body support member 54 is configured to be transported along a plane substantially parallel to the walking path 32 defined by walking platform 30. The moveable body support member 54 is spaced a predetermined distance from the walking platform 30.

The moveable body support member 54 supports a body harness shown by arrow 70 for receiving and supporting the body of a person while being trained to walk. A body weight control apparatus shown by arrow 72 is operatively connected between the body support member 54 and the body harness 70. The body weight control apparatus 72 includes a pulley 76 which cooperates with a locking or ratcheting pulley 78 that receives and passes a rope or line 80 resulting in the other end 96 of the rope or line being used to control the uplifting force applied to the body of a user. By pulling on the other end of the line or rope 96, the uplifting force is applied through pulley 76 and ratcheting pulley 78 to the harness 70 to the body of the user. When the desired weight ratio is reached and the desired amount of weight to be placed onto or applied to the feet of a user or patient during a walk training session is obtained, the end of the line or rope 96 is used to latch or lock the ratcheting pulley 78 thereby setting the desired amount of weight onto the feet of a used. The weight and weight ration can be adjusted or controlled by the ratcheting pulley 78.

A weight-measuring device 84 is located between one end 90 of the rope or line 80 and a harness support 92 supporting the harness 70. The other end 96 of the rope or line 80 is used to apply the uplifting force through pulley 76 and ratcheting pulley 78 to the harness 70 until the desired predetermined weight of a user to be placed on to the feet is obtained by using the readings obtained from the weight-measuring device 84. Thus, the moveable body support member 54 in cooperation with the body harness shown by arrow 70 is used to program a predetermined portion of body weight of a person to be supported by the feet while being trained to walk.

Figure 3:
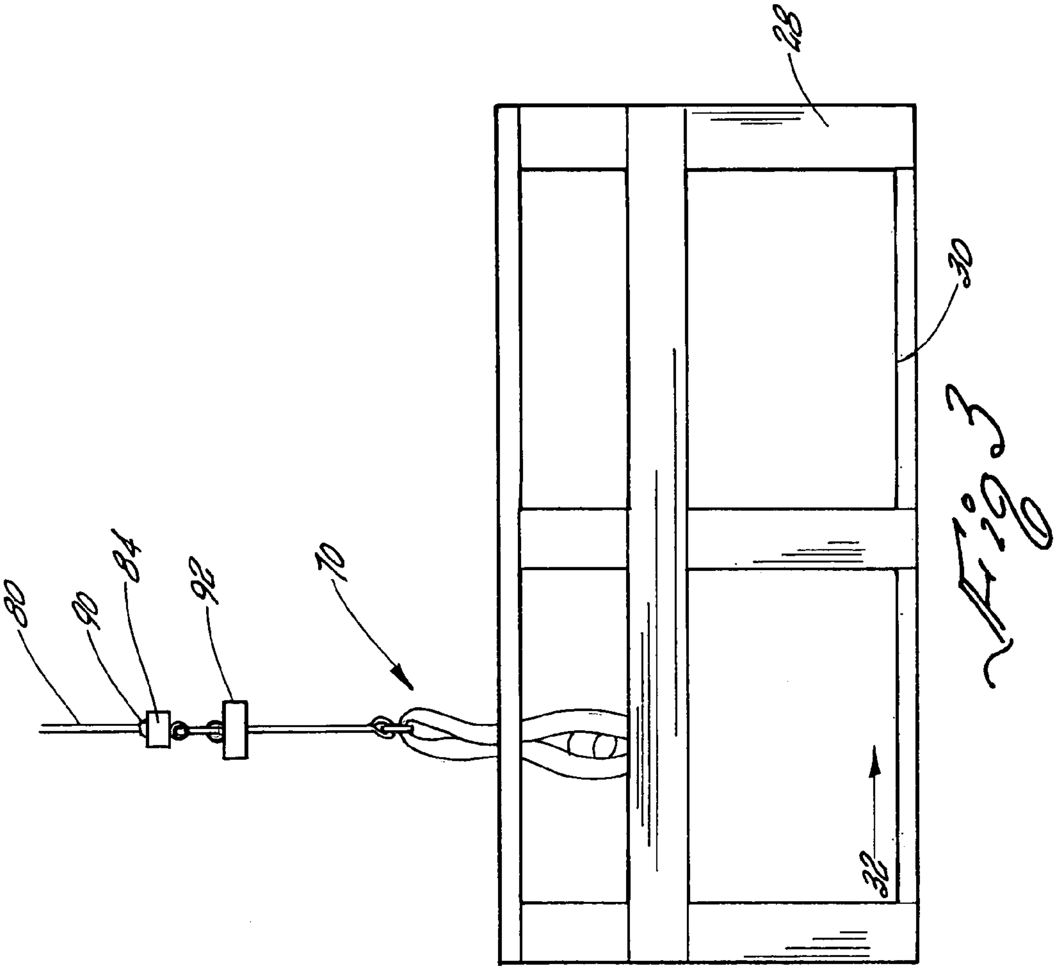
FIG. 3 is a front plan view of a housing structure including an elongated supporting structure having a walking platform defining a walking path illustrated in FIG. 1 and the location of a body harness for receiving and supporting the body of a person while being trained to walk and a body weight control apparatus operatively connected between the body support member and the body harness to program a predetermined portion of body weight of such person to be supported by the feet while being trained to walk.
Figure 2:
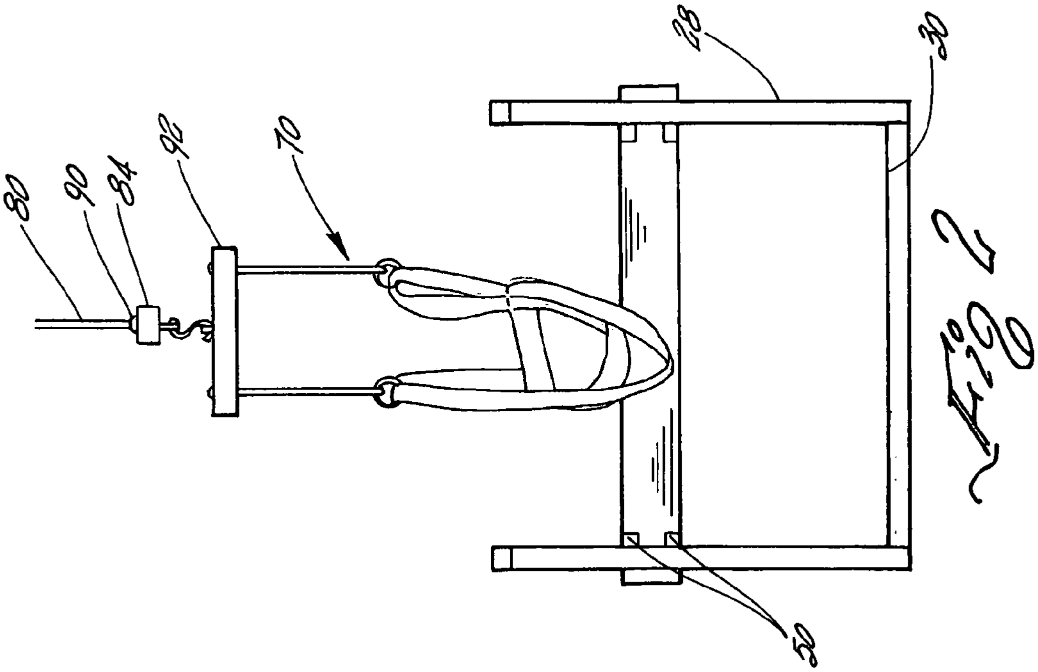
FIG. 2 is a left end elevational view of a housing structure including an elongated supporting structure illustrated in FIG. 1 having a walking platform defining a walking path and the location of a body harness for receiving and supporting the body of a person while being trained to walk and a body weight control apparatus operatively connected between the body support member and the body harness to program a predetermined portion of body weight of such person to be supported by the feet while being trained to walk.

In FIGS. 2 and 3, the apparatus 20 includes an elongated supporting structure 28 having a walking platform 30 defining a walking path 32. The location of the body harness 70, for receiving and supporting the body of a person while being trained to walk, is shown as being spaced from the walking platform 30 and at a distance as required to enable a user to have the user's feet contact the walking platform in order to train for walking. The body weight control apparatus 54 shown in FIG. 1 is operatively connected between the harness support 92 and the body harness 70 through the weight measuring device 84 to program a predetermined portion of body weight of a person to be supported by the feet while being trained to walk.

Figure 4:
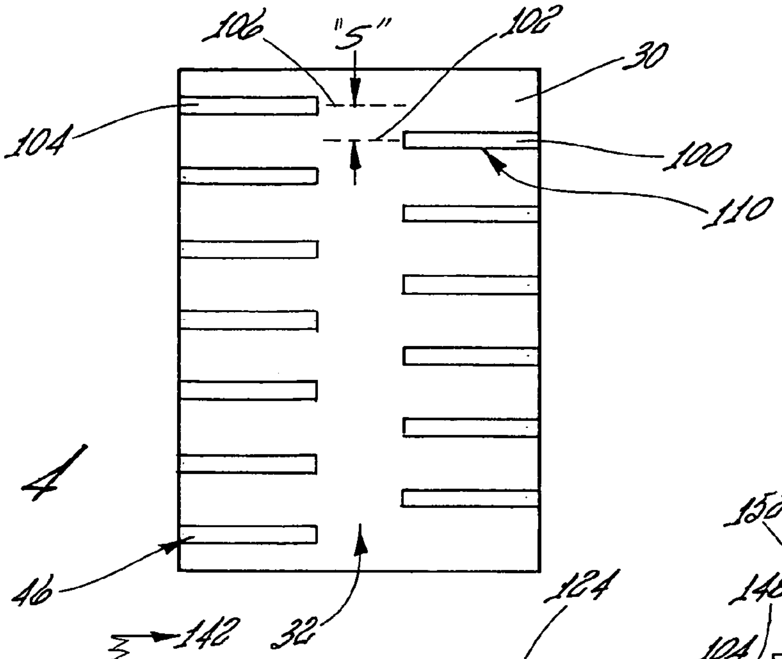
FIG. 4 is a pictorial representation of a walking platform defining a walking path to be traversed by the feet of a person while being trained to walk and showing the location of a plurality of electrodes positioned on the walking platform and spaced to have a selected distance therebetween representing a stride to be traversed by the feet of such person while being trained to walk.

As shown in FIG. 4, the walking platform 30 defines a walking path 32 to be traversed by the feet of a person while being trained to walk. The plurality of electrodes 46 are positioned on the walking platform 30 in a pattern so as to be staggered from side to side and spaced at a selected distance "S" from each other as shown on FIG. 4. The selected distance "S" is the spacing between the adjacent electrodes 46 on the same side of the walking path 32 as well as the spacing between the opposed spaced adjacent electrodes 46 located on the opposite side of the walking path 32. For example, the spacing between the electrode designated as 100 on the right side is spaced a distance "S", as measured from the center line thereof shown by dashed line 102, from the electrode designated as 102, electrode 104 on the left side thereof, as measured from the center line thereof shown by dashed line 106. This structure is referred to herein as two sequential electrodes.

The centerline spacing between adjacent electrodes 46 on the same side of the walking platform 30 is then 2 times "S". In FIG. 4, the electrodes 46 are shown as being removeably attached to the surface of the walking platform 30. The purpose for doing so is to enable the selected distance of a stride to be varied as required for each patient. In the preferred embodiment, the walking platform 30 and the elongated shaped electrodes 46 each have cooperating fastening members shown by arrow 110 to facilitate removeable placement of the elongated shaped electrodes 46 onto the surface of the walking platform 30. The cooperating fastening members 110 are used to maintain the selected spacing "S" between the two sequential elongated shaped electrodes 46.

The cooperating fastening members 110 may be Velco brand fasteners that are in the form of a hook member and loop member. It is envisioned that other known fastening members could be used such as adhesive strips, mechanical connecting device, such as for example snaps, and the like.

Figure 5:
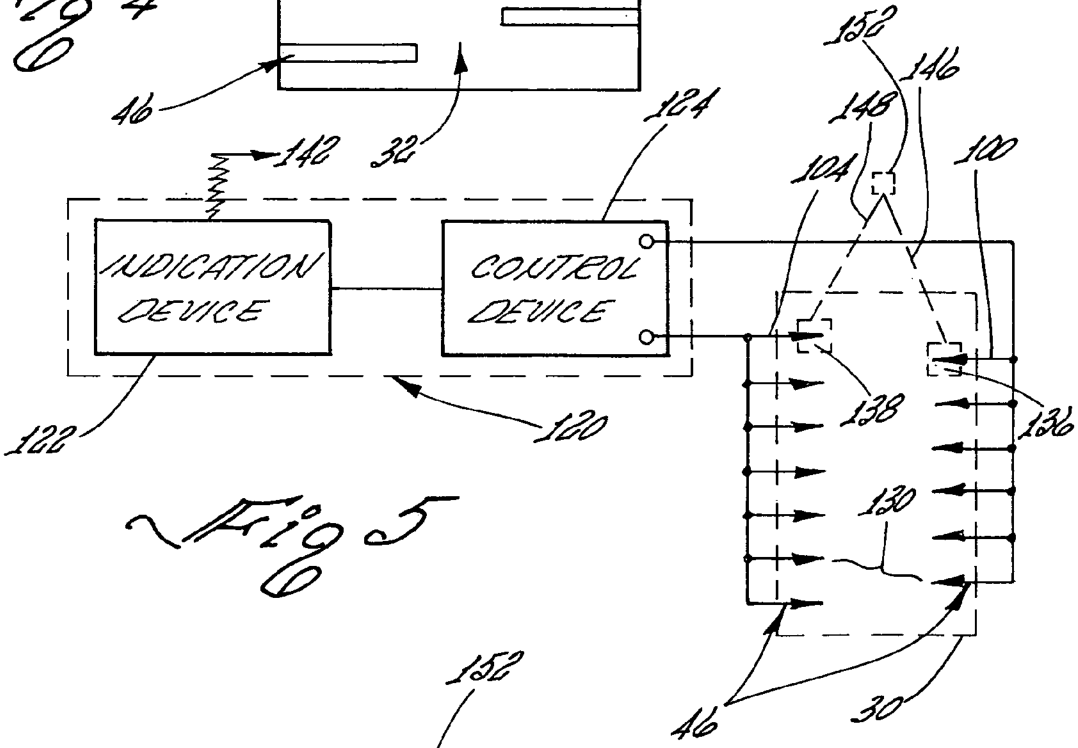
FIG. 5 is a schematic diagram of a signal control circuit having an indication device and a control device wherein the control device is electrically connected to the electrodes located on the walking platform illustrated in FIG. 4 and depicting by dashed lines a first conductive member and a second conductive member configured to be affixed to a walking surface of a pair of shoes to be worn by a person while being trained to walk making electrical contact with two adjacent electrodes located on the walking platform.

FIG. 5 is a schematic diagram illustrating a signal control circuit shown by dashed box 120 having an indication device 122 and a control device 124. The control device 124 is electrically connected to the electrodes 46 located on the walking platform 30 illustrated in FIG. 4. The electrodes 46 located on the left side and right side, respectively of the walking platform 30, essentially define a gap therebetween. An example of the gap is illustrated by bracket 130 between electrodes 100 and 104.

The gap 130 is traversed and the electrical circuit is completed between the appropriate electrodes 46 and the signal control circuit 120 by a first conductive member 136 and a second conductive member 138. The first conductive member 136 and a second conductive member 138 are configured to be affixed to a walking surface of a pair of shoes to be worn by a person while being trained to walk. The first conductive member 136 and a second conductive member 138 when affixed to a walking surface of a pair of shoes to be worn by a person while being trained to walk are positioned by the user physically placing the shoes over two sequential electrodes 46 enabling the first conductive member 136 and a second conductive member 138 to make electrical contact with two sequential electrodes located on the walking platform. When the electrical contact occurs, an electrically conductive path is formed the signal control circuit 120 is responsive to the first conductive member 136 and second conductive member 138 making electrical contact with two sequential electrodes. e.g. two adjacent electrodes 100 and 104, located on the walking platform 30, which is detected by the control circuit 124. The control circuit 124 then enables the indication device 120 for generating a feedback signal, such as an audible sound depicted by arrow 142. The feedback signal need not be an audible sound, but could be another form of a device for communicating to a user such as for example, a light, an annunciator panel or the like.

The feedback signal in the form of an audible sound 142 is communicated directly to such person when such person's feet concurrently position the first conductive member 136 and the second conductive member 138 on and in electrical contact with two sequential electrodes 100 and 104, respectively, defining a stride.

Figure 6:
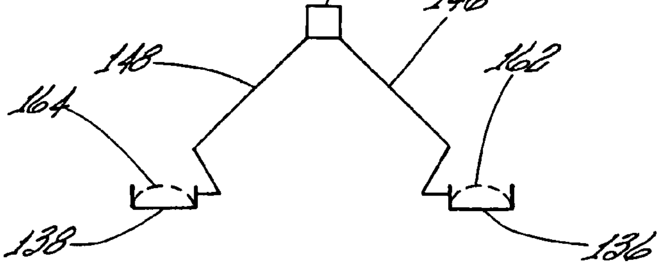
FIG. 6 is a schematic diagram of a first conductive member and a second conductive member configured to be affixed to a walking surface of a pair of shoes to be worn by the user to cause the first conductive member and the second conductive member to make physical and electrical contact with two adjacent electrodes located on the walking platform and electrical conductors and a connector for electrically connecting the first conductive member and the second conductive member to complete an electrically conductive path therebetween.

FIG. 6 is a schematic diagram illustrating the first conductive member 136 and the second conductive member 138 configured to be affixed to a walking surface of a pair of shoes and electrically conductive leads 146 and 148 being connected to first electrode 136 and the second electrode 138, respectively. The electrically conductive leads 146 and 148 may be separate leads to facilitate a user putting a shoe on each foot. A connecting member, shown as 152, is used to electrically connect the electrically conductive leads 146 and 148 to insure that an electrically conductive path exists between the first electrode 136 and the second electrode 138.

Figure 7:
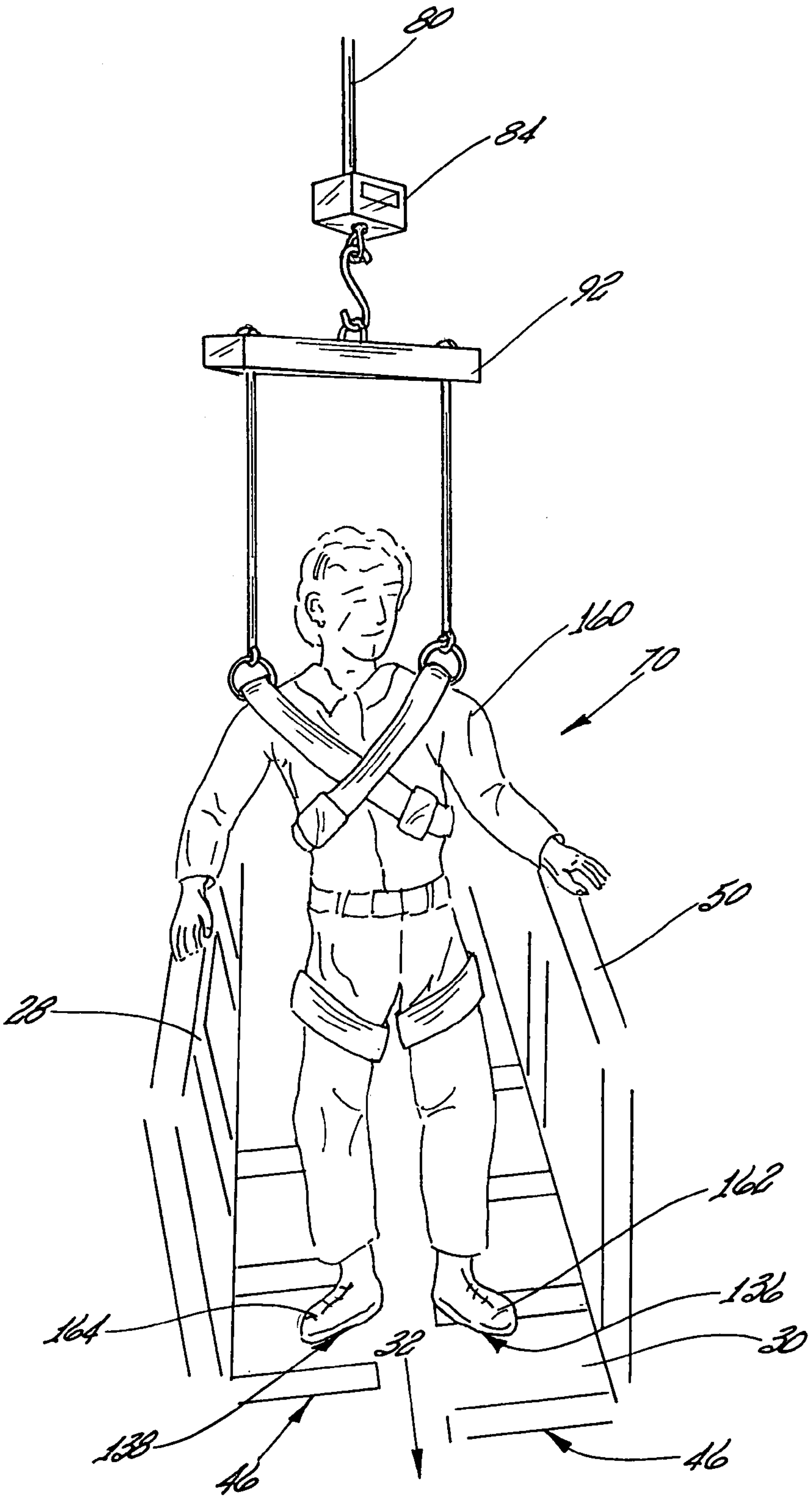
FIG. 7 is a pictorial view of the elongated supporting structure having an elongated handrail to enable a person being trained to walk to grasp the elongated handrail for support while walking along the walking path defined by the walking platform and of the harness and body weight control apparatus for programming a predetermined portion of body weight of a person to be supported by the feet of such person while being trained to walk.
Figure 6:
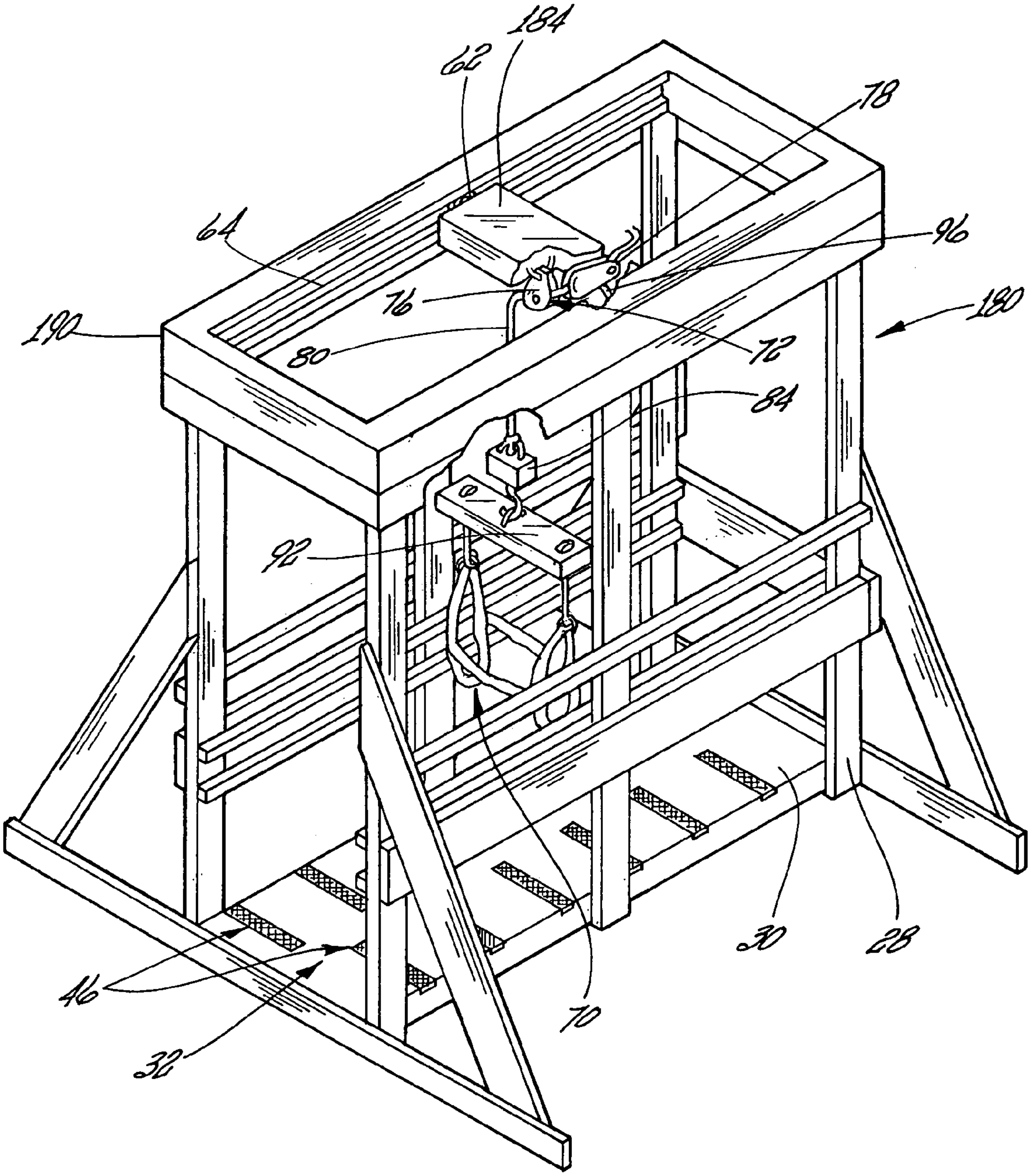

In FIG. 7, the elongated supporting structure 28 has an elongated handrail 50 to enable a person being trained to walk to grasp the elongated handrail 50 for support while walking along the walking path 32 defined by the walking platform 30. The harness 70 receives and supports the body of a user 160. The user's right foot has a shoe 162 having the first electrode 136 affixed to the bottom or walking surface thereof. The user's left foot has a shoe 164 having the second electrode 138 affixed to the bottom or walking surface thereof. The body weight control apparatus 72 including weight measuring device 84 is adjusted by use of the rope or line 80 in conjunction with the pulley 76 and the ratcheting pulley 78 for programming a predetermined portion of body weight of a person 160 to be supported by the feet of such person while being trained to walk.

FIG. 8 illustrates another embodiment of a housing structure 180 including an elongated supporting structure 28 having a walking platform 30 defining a walking path 32. Integral with the housing structure 180 is a moveable body support member 184 which is supported by a rigid support member 190 rigidly affixed to the elongated supporting structure 28. The rigid support member 190 has a track structure 64 for enabling a roller 62 to be transported therein. The moveable body support member 184 is configured to be transported along a plane substantially parallel to the walking path 32 and spaced a predetermined distance from the walking platform 30. The body harness 70 for receiving and supporting the body of a person while being trained to walk is supported by the rigid support member 190.

The body weight control apparatus, shown by arrow 72, is operatively connected between the body support member 54 and the body harness 70 in a manner similar to that shown in FIG. 1. The body weight control apparatus 72 includes the pulley 76 which cooperates with a locking or ratcheting pulley 78 that receives and passes a rope or line 80 resulting in the other end 96 of the rope or line being used to control the uplifting force applied to the body of a user. By pulling on the other end of the line or rope 96, the uplifting force is applied through pulley 76 and ratcheting pulley 78 to the harness 70 to the body of the user. When the desired weight ratio is reached and the desired amount of weight to be placed onto or applied to the feet of a user or patient during a walk training session is obtained, the end of the line or rope 96 is used to latch or lock the ratcheting pulley 78 thereby setting the desired amount of weight onto the feet of a used. The weight and weight ration can be adjusted or controlled by the ratcheting pulley 78.

Figure 9:
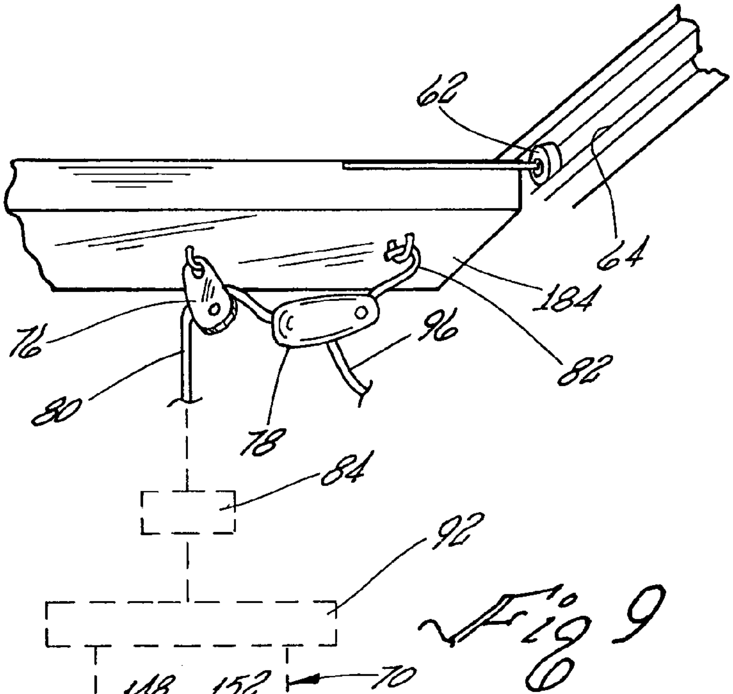
FIG. 9 is a pictorial view of a moveable body support member configured to be transported along a plane substantially parallel to the walking path and spaced a predetermined distance from the walking platform and showing by a dashed line a body harness for receiving and supporting the body of a person while being trained to walk and body weight control apparatus.

FIG. 9 illustrates the moveable body support member 184 and illustrates that the roller 62 and track 64 structure are configured to enable the moveable body support member 184 to be transported along a plane substantially parallel to the walking path 32 and spaced a predetermined distance from the walking platform 30. The weight measuring device 84, support member 92 and the harness 72 are shown by dashed lines.

Also, FIG. 9 shows the body weight control apparatus, shown by arrow 72, and the structural relationship between the pulley 76 which cooperates with a locking or ratcheting pulley 78 that receives and passes a rope or line 80. The ratcheting pulley 78 is supported from the moveable body support member 184 by a hook assembly 82. The other end of the line or rope 96 passing through the pulley 76 and ratcheting pulley 78 is used to control the uplifting force applied to the body of a user through the harness represented by arrow 70.

Figure 10:
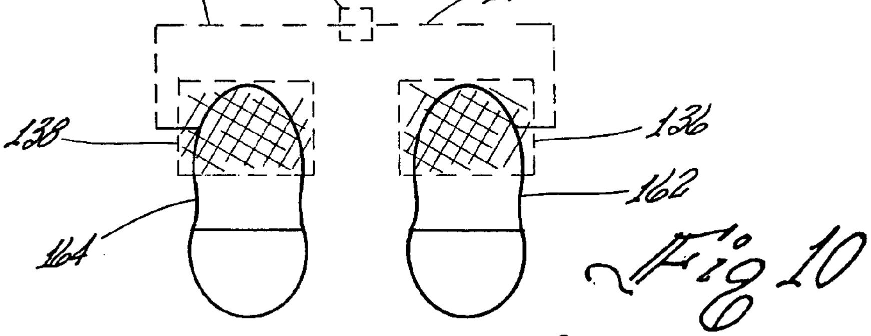
FIG. 10 is a pictorial representation of a first conductive member and a second conductive member formed of wire mesh removeably affixed to the bottom or walking surface of shoes of a user and showing with a dashed line that the electrical conductors extending from each of the first conductive member and the second conductive member are electrically connected between the shoes.

FIG. 10 depicts the shoe 162 for the right foot and shoe 164 for the left foot as shown in FIG. 7. In FIG. 10, the first conductive member 136 and the second conductive member 138 are formed of wire mesh removeably affixed to the bottom or walking surface of shoes of a user. As shown in FIG. 10, the electrically conductive leads 146 and 148 are connected to he first electrode 136 and the second electrode 138, respectively. The connecting member 152 functions to electrically connect the electrically conductive leads 146 and 148 to insure that an electrically conductive path exists between the first electrode 136 and the second electrode 138. This structure provides a means for insuring that the first conductive member 136 and second conductive member 138 are always electrically connected between the shoes whether or not the shoes are located over to sequential electrodes 46 to complete an electrically conductive path to the signal control circuit 120 shown in FIG. 5.

In the preferred embodiment, the first electrode 136 and the second electrode 138 are formed of a wire mesh affixed to the walking surface of the shoes 162 and 164. The wire mesh must be conductive on the portion thereof that physically contacts the electrodes 46. It is envisioned that shoes having a wire mesh affixed to the walking surface thereof could be used in practicing this invention. In the preferred embodiment of the invention, the first conductive member 136 and the second conductive member 138 are formed of wire mesh which are removeably affixed to the walking surface of the shoes 162 and 164 and the electrically conductive leads 146 and 148 are connected to he first electrode 136 and the second electrode 138 through a connecting member 152. This structure permits a user to use the user's personal shoes for training by attaching to the shoes the wire meshes that are removeably affixed to the walking surface thereof.

Figure 11:
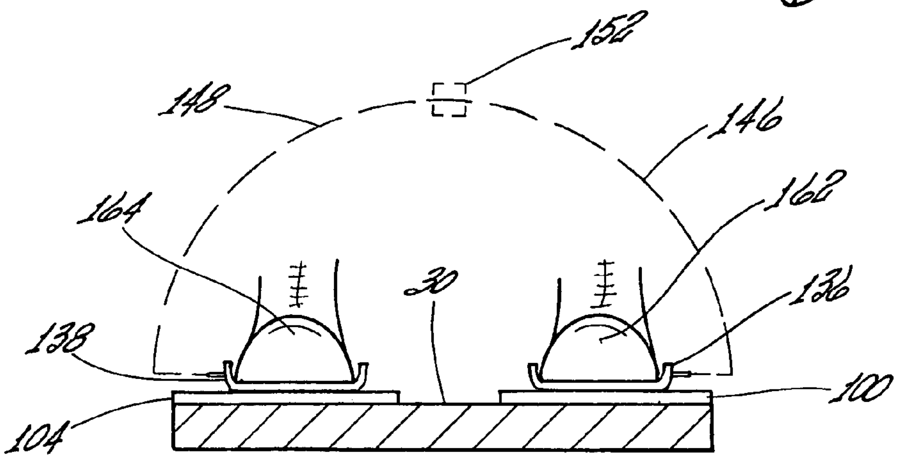
FIG. 11 is a pictorial representation of shoes of a user having a first conductive member and second conductive member formed of wire mesh removeably affixed to the bottom or walking surface of shoes of a user making electrical contact with at least two electrodes on the walking platform and showing by, a dashed line, that the electrical conductors extending from each of the first conductive member and second conductive member are electrically connected between the shoes.

FIG. 11 illustrates pictorially that the user has positioned one shoe on each of the two sequential electrodes. Shoe 162 having the first electrode 136 and the electrical conductor 146 is shown with the first electrode 136 physically contacting the electrode 100. In a similar manner, shoe 164 having the second electrode 138 and having the electrical conductor 148 is shown with the second electrode 136 physically contacting the electrode 104. When the shoes 162 and 164 are positioned over two sequential electrodes, e.g. 100 and 104, the first conductive member 136 and the second conductive member 138, formed of wire mesh removeably affixed to the bottom or walking surface of shoes of a user, physically come into contact with and make an electrically conductive connection with the two sequential electrodes 100 and 104. Connecting member 152 insures that the first conductive member 136 and the second conductive member 138 form an electrically conductive path from the electrodes 100 and 104 to the signal control circuit 120 shown in FIG. 5

Apparatus for Training a Body Part of a Person

Figure 12:
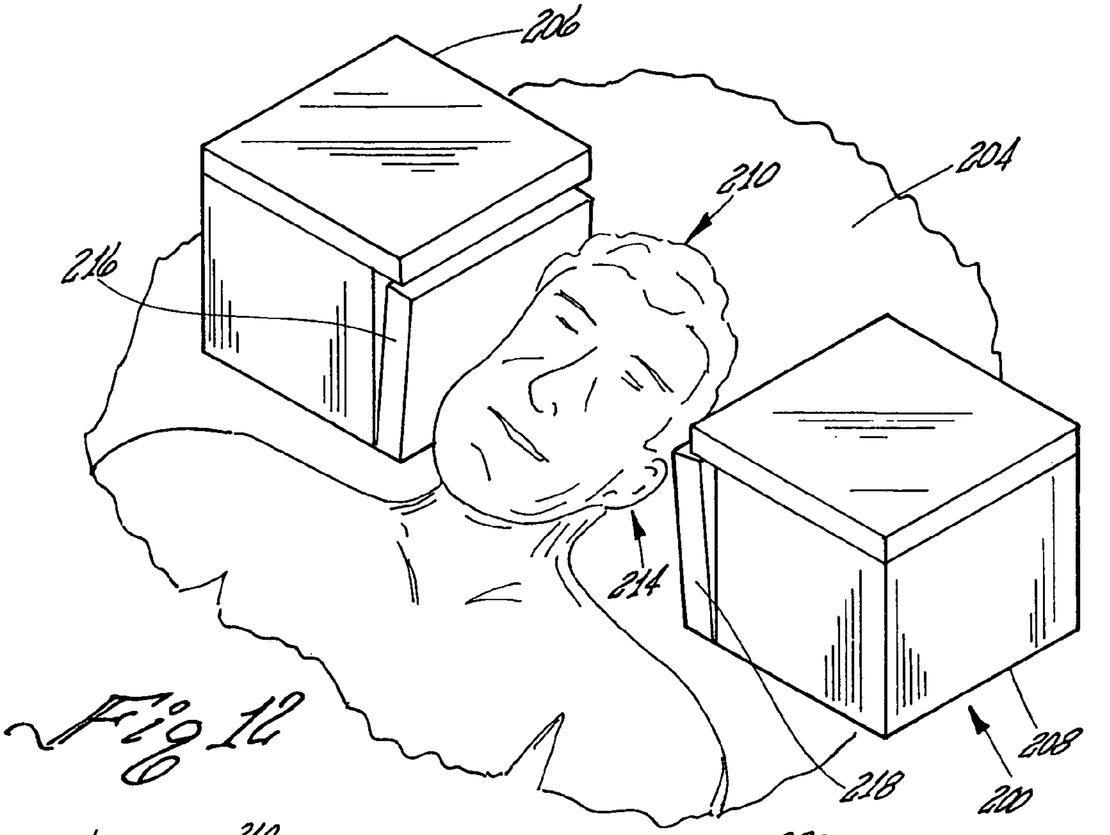
FIG. 12 is a pictorial representation of an apparatus for training head and neck movement as a body part having a structure configured to receive and support a body part of a person requiring training and a body part supporting member defining a movement path of a selected distance to be traversed by a body part of a person while being trained and at least one sensor being positioned along the movement path on each side of the head of a user.

The apparatus of the present invention has utility for training a body part of a person, such as for example, the head and neck, an arm a hand or the like. FIG. 12 illustrates an apparatus 200 having structure 204, e.g. a flat generally planar surface, configured to receive and support a body part, a head with its neck denoted by arrow 214 of a person 210 requiring training. The structure 204 functions as a body part supporting member defining a movement path of a selected distance to be traversed by a body part of a person while being trained. In FIG. 12, the apparatus 200 includes a first end sensor device 204 located to the left of the head 214 of a person 210 that defines one end of a movement path. In addition, the apparatus 200 includes a second end sensor device 208 located to the right of the head 214 of a person 210 that defines the other end of a movement path. The so defined movement path is of a selected distance that is to be traversed by the body part, e.g., head 214 of a person 210.

As illustrated in FIG. 12, the head 214 to be trained is positioned intermediate the first end sensor device 204 and the second end sensor device 208. The training comprises the person 210 exerting sufficient force on the head 214 to traverse the distance or length of the selected distance of the movement path defined by the space between the first end sensor device 204 and the second end sensor device 208.

Figure 16:
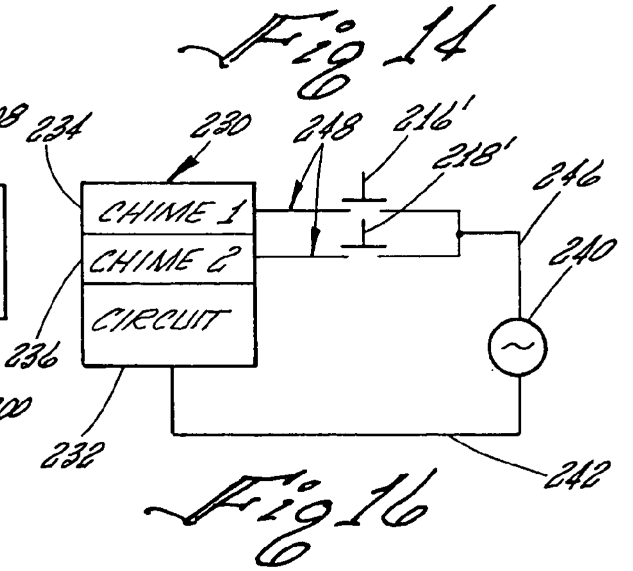
FIG. 16 is a schematic diagram of a signal control circuit having a circuit electrically connected to the sensors illustrated in FIG. 12 for controlling a multi-signal indication device in the form of chime 1 and chime 2 and being responsive to the body part actuating a designated sensor for generating a feedback signal in the form of chime 1 for the head physically contacting and actuating the right sensor and in the form of chime 2 for the head physically contacting and actuating the left sensor which is communicated to such person to verify that such person's head and neck as a body part has traversed the movement distance.

The first end sensor device 206 has a pivotally mounted engagement member 216 which is configured to be physically contacted by the head 214 and which responds by moving in a counterclockwise direction towards the first end sensor device 206 to actuate a sensor, e.g. a switch or solenoid, depicted by element 216' in FIG. 16.

In a similar manner, the second end sensor device 208 has a pivotally mounted engagement member 218 which is configured to be physically contacted by the head 214 and which responds by moving in a clockwise direction towards the second end sensor device 208 and actuates a sensor, e.g. a switch or solenoid, depicted by element 218' in FIG. 16.

Thus, the first end sensor device 206 is positioned along the movement path and is spaced a selected distance from a reference point which is the second end sensor device 204. The movement path to be traversed by a body part of such person while being trained is of a selected distance and is defined by the spacing between the first end sensor device 206 and the second end sensor device 208. The sensor 216' of the first end sensor device 216 and the sensor 218' of the second end sensor device 218 are responsive to the body part, e.g. head 214, traversing the selected distance and physically contacting and actuating at least one of the sensors 216' or 218'. The actuation of the sensors 216' and 218' operates or enables a signal control circuit 230 depicted in FIG. 16 to generate an audible sound as a feedback signal to the person verifying that the head 214 has traversed the selected distance.

Figure 13:
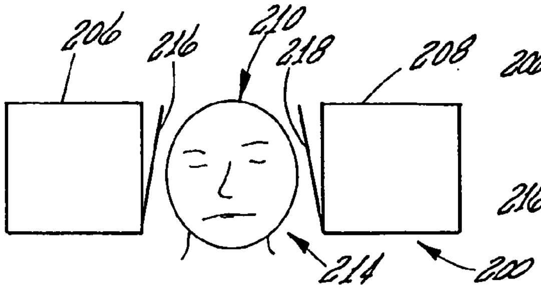
FIG. 13 is a pictorial representation of an apparatus for training head and neck movement as a body part wherein the apparatus structure is configured to have a sensor at each end of a movement path of a selected distance to be traversed by the head and neck as a body part of a person while being trained and illustrating the position of a head intermediate the two opposed spaced sensors.

FIG. 13 depicts pictorially the apparatus 300 for training head with its neck movement as a body part. The apparatus 200 is configured as shown in FIG. 12 to have an end sensor device at each end of a movement path of a selected distance. The first end sensor device 206 having a pivotally mounted engagement member 216 is positioned to the left side of the head 214 and defines one end of the selected distance. The second end sensor device 208 having a pivotally mounted engagement member 218 is positioned in an opposed position, that is to the right side of the head 214, and defines the other end of the selected distance. The head 214 of a person 210 is positioned between the first end sensor device 206 and the second end sensor device 208. The selected distance therebetween is to be traversed by the head 214 as a body part of a person being trained. FIG. 13 illustrates the position of a head 214 intermediate the two opposed spaced sensors 216' and 218'.

Figure 14:
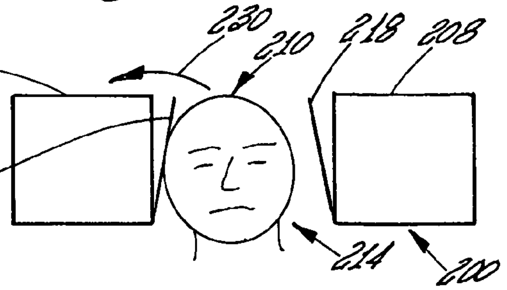
FIG. 14 is a pictorial representation of an apparatus for training head and neck movement as a body part illustrated in FIG. 13 wherein the head and neck as a body part of a person while being trained has traversed the movement path of a selected distance and makes physically contact with and actuates the sensor located on the left side of the movement path.

FIG. 14 is a pictorial representation of the apparatus 200 illustrated in FIG. 13 for training movement of a head 214. In FIG. 14, the head 214 as a body part of a person 210 which is being trained has traversed the movement path of a selected distance towards the first end sensor device 206 and the head 214 makes physically contact with and pivots the pivotally mounted engagement member 216 in a counterclockwise direction to actuate the sensor 216' located on the left side of the selected distance of the movement path. The actuation of the sensor 216' operates the signal control circuit 230 depicted in FIG. 16 to generate an audible sound as a feedback signal to the person verifying that the head 214 has traversed the selected distance and engaged the first end sensor device 206.

Figure 15:
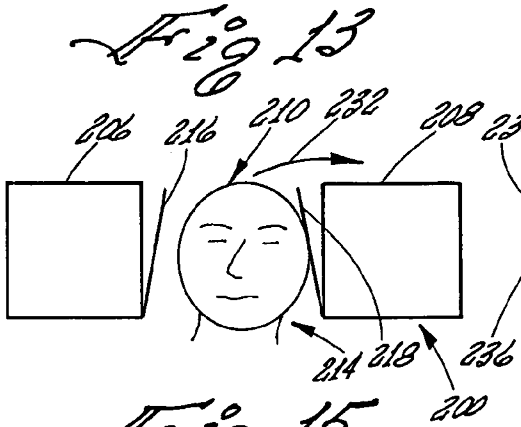
FIG. 15 is a pictorial representation of an apparatus for training head and neck movement as a body part illustrated in FIG. 13 wherein the head and neck as a body part of a person while being trained has traversed the movement path of a selected distance and makes physically contact with and actuates the sensor located on the right side of the movement path.

FIG. 15 is likewise a pictorial representation of the apparatus 200 illustrated in FIG. 13 for training head movement. In FIG. 15, the head 214 as a body part of a person 210 has traversed the movement path of a selected distance towards the second end sensor device 208 and the head 214 makes physically contact with and pivots the pivotally mounted engagement member 218 in a clockwise direction to actuate the sensor 218' located on the right side of the selected distance of the movement path. The actuation of the sensor 218' operates the signal control circuit 230 depicted in FIG. 16 to generate an audible sound as a feedback signal to the person verifying that the head 214 has traversed the selected distance and engaged the second end sensor device 208.

FIG. 16 illustrate the preferred embodiment of a signal control circuit 230 operatively connected to the sensors 216' and 218'. The signal control circuit 230 is operatively connected to an electrical power source, e.g. an alternating current source such as a 60 cycle, 120 volt ac supply, or a direct current source such as a battery, depicted by element 240. Electrical conductor 242 connects one side the power source 240 to the signal control circuit 230 and the other side of the power source is connected to the signal control circuit through electrical conductor 246, the sensors 216' and 218' which are electrically connected in parallel, and conductors 248 to complete the circuit. The signal control circuit 230 includes a detection circuit 232 that controls actuation of a multi-signal indication device in the form of chime 1 and chime 2. Each chime produces a different audible tone so that a person can differentiate between physically contacting the first end sensor device 206 and the second end sensor device 208.

In FIG. 14, when the head 214 physically engages the first end sensor device 206 as described above, sensor 216' is actuated and closes the circuit illustrated in FIG. 16 to actuate chime 1.

In FIG. 15, when the head 214 physically engages the second end sensor device 208 as described above, sensor 218' is actuated and closes the circuit illustrated in FIG. 16 to actuate chime 2.

As such, the signal control circuit is responsive to the body part actuating the at least one sensor for generating a feedback signal which is communicated to such person to verify that such person's body part has traversed a selected distance.

Method of Using the Apparatus

A method for training a person having a traumatic injury to walk is taught by this invention. The method comprises the steps of: (i) providing a walking platform defining a walking path to be traversed in strides of a selected distance by the feet of a person while being trained to walk; (ii) positioning electrodes on the walking platform having a selected distance therebetween representing a stride to be traversed by the feet of such person while being trained; (iii) affixing a conductive member to a walking surface of each shoe to be worn by such person while being trained to walk and electrically connecting the conductive members with an electrical conductor; (iv) placing a person to be trained in a body harness for receiving and supporting the body of a person while being trained to walk; (v) connecting the body harness and body of a person to a moveable body support member configured to be transported along a plane substantially parallel to the walking path and spaced a predetermined distance from the walking platform; (vi) programming with a body weight control apparatus operatively connected between the body support member and the body harness a predetermined portion of body weight of such person to be supported by the feet while such person is being trained to walk; (vii) training such person to move such person's feet wherein each foot has a shoe having a conductive member such that one foot having a shoe having a conductive member is transported to and brought into electrical contact with a selected electrode and the other foot having a shoe having a conductive member is transported by such person while being trained to walk to make electrical contact with a sequential electrode such that the conductive members of the shoes on the person's feet concurrently make electrical contact with its associated electrode; and (viii) generating a feedback signal with a control circuit in response to the conductive members of each shoe on the feet of such person while being trained to walk concurrently making electrical contact with two sequential electrodes.

The above method may further comprise the step of communicating the feedback signal to such person to verify that such person's feet are positioned on and the conductive members of each shoe on the feet of such person while being trained to walk are making electrical contact with two sequential electrodes defining a stride.

The above method may include the step of programming the body weight control apparatus programs a magnitude of the predetermined portion of body weight of such person to be supported by the feet of such person while being trained to walk to be in the range from about 10% to about 100% of total body weight of such person.

The above method may include the step of generating a feedback signal includes a signal control circuit having an indication device to generate the feedback signal.

The above method may include the step of generating a feedback signal includes a signal control circuit having an indication device to generate the feedback signal in the form of an audible sound.

A method for training a body part of a person is also taught by the present invention. The method comprises the steps of: (i) providing a structure configured to receive and support a body part of a person requiring training, the structure having a body part supporting member defining a movement path of a selected distance to be traversed by a body part of a person while being trained; (ii) positioning at least one sensor along the movement path and spaced a selected distance from a reference point representing a selected distance to be traversed by a body part of such person while being trained, the sensor being responsive to the body part traversing the selected distance and physically contacting and actuating the at least one sensor; (iii) positioning a body part of a person to be trained onto the structure and along the movement path having the selected distance to be traversed by the body part of such person while being trained; (vi) training such person to move such person's body part along the movement path having the selected distance and into physical contact with and actuating the at least one sensor verifying that the body part has been transported over the selected distance; and (v) generating a feedback signal with a control circuit in response to the body part actuating the at least one sensor verifying that the body part has been transported over the selected distance.

The above method may include the step of providing including the sensor being in the form of at least one electrode and wherein the step of positioning the at least one sensor includes the body part having a second cooperating electrode removeably connected to and configured to traverse the selected distance with the body part and to actuate the at least one electrode by physically engaging and establishing an electrically conductive path between the second cooperating electrode and the at least one electrode and wherein the signal control circuit is responsive to the second cooperating electrode actuating the at least one electrode for generating a feedback signal which is communicated to such person to verify that such person's body part has traversed the selected distance.

The above method may include the step of providing including the sensor being in the form of switch and wherein the step of positioning the at least one sensor includes the body part having a second cooperating electrode removeably connected to and configured to traverse the selected distance with the body part to physically contacting and actuating the switch and wherein the signal control circuit is responsive to the body part traversing the selected distance and physically contacting and actuating the switch for generating a feedback signal which is communicated to such person to verify that such person's body part has traversed the selected distance.

The above method may include the body part comprising the feet of a person and the training comprises teaching a person to walk.

The above method may include the body part comprising the head of a person and the training comprises teaching a person to move the head laterally side by side.

The above method may include a signal control circuit having an indication device to generate the feedback signal.

The above method may include a signal control circuit having an indication device to generate the feedback signal in the form of an audible sound.

EXAMPLES AND PROTOCOLS

As discussed above, the teaching of the present invention has utility for training a body part of a user. Discussed below are examples and protocols for use of the apparatus for training a body part of a user.

Example 1

The apparatus of FIG. 1 was used to train a patient to walk who was a 10 year old male weighing about 80 pounds and, because of cerebral palsy, being confined to a wheel chair. The training commenced with placing the patient into the harness shown in FIG. 7 and programming the a body weight control apparatus to place about 10% of the body weight of such person to be supported by the feet while being trained to walk. Fifteen (15) days and by training at least two times per day and varying the programmed weight place onto the feet of the patient from the 10% to 100%, the patient was able to walk without the apparatus and no longer needed the wheel chair.

Example 2

The apparatus of FIG. 1 was used to train a patient to walk, who was a male in his early 20's, a Vietnam war veteran weighing about 170 pounds and having a traumatic spinal cord injury and who could only walk with quad cane. The training commenced with placing the patient into the harness shown in FIG. 7 and programming the a body weight control apparatus to place about 10% of the body weight of such person to be supported by the feet while being trained to walk. The first training sessions comprising about fourteen (14) days resulted in the patient being able to only take several steps. Over the next fourteen (14) thereafter, and by training at least two times per day and varying the programmed weight place onto the feet of the patient from the 10% to 100%, the patient was able to walk without the apparatus and no longer needed the quad cane. Follow-up visits with the patient disclosed that the patient continued to be able to walk without assistance including use of any walking apparatus, such as a cane or walker.

Protocol 1-Lateral Head Movement Training

The apparatus of FIG. 12 can be used to train a patient to move the patient's head. A typical patient may be a 4 to 5 year old juvenile weighing about 40 pounds to about 50 pounds. A typical patient may have a traumatic head and neck injury. The training commences with placing the patient onto the apparatus structure having a flat generally planar surface that received and supported the upper part of the body of a patient and situated to place the head between the first end sensor device and the second end sensor device to enable the head to be moved laterally relative to the center line of the back. The first initial training sessions lasting approximately one (1) to two (2) days and comprises the patient practicing head movement in a lateral side by side pattern along the movement path over a distance of 1 inch. When the initial training goal is reached, the audible signal is generated advising the patient that the desired 1-inch movement of the head has been achieved. This training is repeated until the patient successfully achieves the goal four (4) consecutive times in a row.

Over the next successive 3 to 4 days, the patient's head movement in a lateral side-by-side pattern along the movement path is increased to 2 inches. As the patient successfully reaches the goal, the audible signal is generated advising the patient that the desired 2-inch movement of the head has been achieved. Again, this training is repeated until the patient successfully achieves the goal four (4) consecutive times in a row.

Over sequential 3 to 4 day sessions following the above criteria, the same procedure is repeated for 3 inches, 4 inches and 5 inches as the targeted goals. At each session, the audible signal is generated advising the patient that the desired movement of the head has been achieved.

Each session is limited to a maximum of 20 to 30 movements. The maximum number of session per day is limited to 2 sessions.

By following the above protocol, in about 15 days to about 20 days, the patient can achieve head movement of 5 inches.

Protocol 2-Anterior and Posterior Head Movement Training

In an alternative training program for the head, the patient may be placed on a side position locating the forehead towards one sensor and the back of the head towards the other spaced sensor. The exercise may comprise the patient moving the head in a forward and backward movement path relative to the centerline of the backbone sensor to perform an anterior and posterior head movement training. An appropriate targeted movement distance for each session ranging from 1-inch movement to a 5 inch would be used.

Protocol 2-Arm or Leg Movement Training

In an alternative training for arms or legs of a patient, a similar the training session protocol would be the same as for the head training program.

The arm or leg to be trained would be placed between the sensors and the length of the movement path would be gradually increased using the above criteria.

This invention may be used in substantially the configuration of the preferred embodiment or of the disclosed alternate embodiment or variations thereof. It will be appreciated that various alterations and modifications may be made to the apparatus to enhance the functional characteristics thereof. All such variations and modifications should be considered to fall within the scope of the invention as broadly hereinbefore described and as claimed hereafter.

All such uses, variations, modifications and the like are anticipated to be within the scope of this invention.

What is claimed is:

1. A method for training a person comprising the steps of:

providing a structure configured to receive and support a person requiring training for walking, said structure having a member defining a walking path of a selected distance to be traversed by a person while being trained for walking;

positioning at least one electrode sensor along said walking path and spaced a selected distance from a reference point representing a selected distance to be traversed by a person while being trained, said selected distance being equivalent to at least three steps from a reference point representing a selected distance to be traversed by a person while being trained, and said electrode sensor being responsive to a second cooperating electrode removeably connected to said person and configured to traverse said selected distance with the person and to actuate said electrode sensor by physically engaging and actuating said at least one electrode sensor by establishing an electrically conductive path between said second cooperating electrode and said electrode sensor;

placing said person to be trained in a body harness for receiving and supporting the person while being trained to walk;

positioning a person to be trained for walking onto the structure along the walking path having the selected distance to be traversed by such person while being trained;

training such person to move along the walking path having the selected distance and into physical contact with and actuating said at least one electrode sensor verifying that said person has traversed said selected distance; and generating a feedback signal with a control circuit in a response to the person actuating said at least one electrode sensor verifying that said person has traversed said selected distance.

2. The method of claim 1 wherein the step of providing includes said electrode sensor being in the form of at least one electrode and wherein the step of positioning said at least one electrode sensor includes said person having a second cooperating electrode removeably connected to and configured to traverse said selected distance with the person and to actuate said at least one electrode by physically engaging and establishing an electrically conductive path between said second cooperating electrode and said at least one electrode and wherein said signal control circuit is responsive to said second cooperating electrode actuating said at least one electrode for generating a feedback signal which is communicated to such person to verify that such person has traversed said selected distance.

3. The method of claim 1 wherein the step of providing includes said electrode sensor being in the form of switch and wherein the step of positioning said at least one electrode sensor includes said person having a second cooperating electrode removeably connected to and configured to traverse said selected distance with the person to physically contacting and actuating said switch and wherein said signal control circuit is responsive to said person traversing said selected distance and physically contacting and actuating said switch for generating a feedback signal which is communicated to such person to verify that such person has traversed said selected distance.

4. The method of claim 2 wherein the person has two feet and the training comprises teaching a person to walk using two feet.

5. The method of claim 1 wherein said a signal control circuit includes an indication device to generate said feedback signal.

6. The method of claim 1 wherein said a signal control circuit includes an indication device to generate said feedback signal in the form of an audible sound.

7. A method for training a person having a traumatic injury to walk comprising the steps of:

providing a walking platform defining a walking path to be traversed in strides of a selected distance by the feet of a person while being trained to walk;

positioning electrodes on said walking platform having a selected distance therebetween representing a stride to be traversed by the feet of such person while being trained;

affixing a conductive member to a walking surface of each shoe to be worn by such person while being trained to walk and electrically connecting the conductive members with an electrical conductor;

placing a person to be trained in a body harness for receiving and supporting the body of a person while being trained to walk;

connecting said body harness and body of a person to a moveable body support member configured to be transported along a plane substantially parallel to the walking path and spaced a predetermined distance from said walking platform;

programming with a body weight control apparatus operatively connected between said body support member and said body harness a predetermined portion of body weight of such person to be supported by the feet while such person is being trained to walk;

training such person to move such person's feet wherein each foot has a shoe having a conductive member such that one foot having a shoe having a conductive member is transported to and brought into electrical contact with a selected electrode and the other foot having a shoe having a conductive member is transported by such person while being trained to walk to make electrical contact with a sequential electrode such that the conductive members of the shoes on the person's feet concurrently make electrical contact with its associated adjacent electrode; and generating a feedback signal with a control circuit in response to the conductive members of each shoe on the feet of such person while being trained to walk concurrently making electrical contact with two sequential electrodes.

8. The method of claim 7 further comprising the step of:

communicating the feedback signal to such person to verify that such person's feet are positioned on and the conductive members of each shoe on the feet of such person while being trained to walk are making electrical contact with two sequential electrodes defining a stride.

* * * * *